3,546,247
FUNGICIDAL AND BACTERICIDAL BISDITHIOLE COMPOUNDS
Howard Newman, Spring Valley, and Robert Bruce Angier, Pearl River, N.Y., assignors to American Cyanamid Company, Stamford, Conn., a corporation of Maine
No Drawing. Filed Oct. 12, 1967, Ser. No. 674,742
Int. Cl. C07d 71/00
U.S. Cl. 260—327                    3 Claims

ABSTRACT OF THE DISCLOSURE

This invention provides antifungal and antibacterial bis-dithiole compounds of the formula:

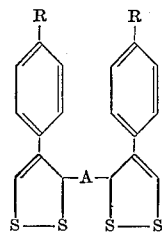

wherein A is selected from the group consisting of oxygen and sulfur, the R's can be the same or different and are selected from the group consisting of hydrogen and methoxy.

---

This invention relates to and has for its object the provision of new organic compounds. More particularly, this invention relates to compounds represented by the following general Formula I:

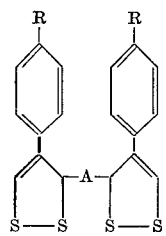

wherein A is selected from the group consisting of oxygen and sulfur, the R's can be the same or different and are selected from the group consisting of hydrogen or methoxy. The novel compounds of this invention are in general yellow or yellowish-orange colored crystalline materials. They are relatively soluble in the common organic solvents, as for example, acetone and petroleum ether and insoluble in water.

The compounds of Formula I can be obtained from 4-aryl-1,2-dithiolium salts such as 4-phenyl-1,2-dithiolium bisulfate. The preparation of the starting materials is described by E. Klingsberg in the J. Am. Chem. Soc., 83, 2934 (1961). The starting material wherein the phenyl radicals contains the methoxy substituent is disclosed in U.S. Pat. 3,158,621, issued Nov. 24, 1964 to E. Klingsberg. The preparation of the novel compounds of this invention is illustrated schematically in the following flowsheet:

EQUATION A

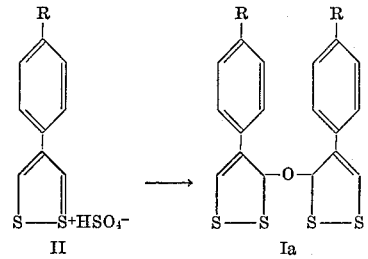

EQUATION B

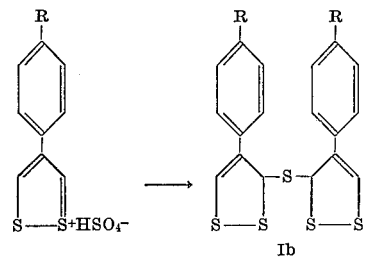

It will be obvious that compounds of Formulae Ia and Ib wherein the respective phenyl rings are differently substituted can be obtained by employing as starting materials mixtures of reactants wherein the R substituents are different.

To produce the substituted or unsubstituted 3,3'-oxy-bis[4-phenyl-3H-1,2-dithioles], represented by Formula Ia wherein A is oxygen, the compounds of Formula II having the desired R substituent or mixtures thereof having different R substituents are reacted under moderately alkaline conditions. Suitable general bases include e.g. sodium bicarbonate, potassium bicarbonate, sodium acetate, or sodium benzoate. The pH of the reaction solution is maintained between about 11 and about 3, preferably between about 8 and 6. Since the compounds of the present invention are relatively insoluble in water, at room temperature, it is convenient to effect reaction in a water solution and subsequently recover the products by crystallization and filtration. Reaction is carried out at a temperature between about 10° C. and about 70° C. Desirable rates of reaction are obtained at a temperature between 15° C. and 30° C.

To produce the substituted or unsubstituted 3,3'-thio-bis-[4-phenyl-3H-1,2-dithiole], represented by Formula Ib wherein A is sulfur, the compound of Formula II having the desired R substituent or mixtures thereof having different R substituents are reacted with a compound capable of producing the sulfide ion under reaction conditions. Reaction is conveniently carried out in a water solution to facilitate isolation and recovery of the product. Reaction is carried out at a temperature between about 10° C. and about 70° C. Desirable rates of reaction are obtained at a temperature between 15° C. and 30° C. The reaction mixture is maintained at a pH between about 8 and about 0.5, preferably between about 5 and about 1.

The novel compounds of the present invention possess a high degree of antifungal activity against a variety of fungi. This activity indicates the compounds to be potentially useful as medicaments in the treatment of fungal infections and related disorders. Table I shows the in vitro antifungal activity of 3,3'-oxybis[4-phenyl-3H-1,2-dithiole], 3,3' - oxybis[4 - p - methoxyphenyl - 3H - 1,2 - dithiole] and 3,3'-thiobis[4-phenyl-3H-1,2-dithiole] against a number of representative fungal organisms.

TABLE I

| Organism | Minimal inhibitory concentration, µg./ml.* | | |
|---|---|---|---|
| | 3,3'-oxybis [4-phenyl-3H-1,2-dithiole] | 3,3'-oxybis [4-p-methoxyphenyl-3H-1,2-dithiole] | 3,3'-thiobis [4-phenyl-3H-1,2-dithiole] |
| Candida albicans | >250 | >250 | >250 |
| Cryptococcus neoformans | 62 | >250 | >250 |
| Saccharomyces cerevisiae | 6.2 | | 15 |
| Mucor ramannianus | 31 | | 62 |
| Fusarium epi-sphaeria | 6.2 | | 31 |
| Hormodendrum cladosporoides | 62 | | >250 |
| Trichophyton mentagrophytes | 3.1 | 3.1 | 6.2 |
| Microsporum gypseum | 6.2 | 6.2 | 31 |
| Penicillium digitatum | 31 | | 62 |
| Memnoniella echinata | 31 | | 62 |
| Chaetomium globosum | 3.1 | | 6.2 |
| Aspergillus fumigatus | >250 | | >250 |
| Trichophyton tonsurans | | 3.1 | |
| Trichophyton rubrum | | 3.1 | |
| Microsporum canis | | 3.1 | |

*Using agar dilution technique on asparagine, meat extract, dextrose agar.

The following examples illustrate the present invention and are not intended to limit the same.

Example 1.—Preparation of 3,3'-oxybis[4-phenyl-3H-1,2-dithiole]

A filtered solution of 4.8 g. (0.017 mole) of 4-phenyl-1,2-dithiolium bisulfate in 150 ml. of water is treated at room temperature with 40 ml. of saturated aqueous sodium bicarbonate. (An orange solid forms.) The pH of the aqueous supernatant is about 8. After 30 minutes at room temperature with frequent manual swirling, the solid is collected and washed with water. After drying for about 10 minutes, the solid is treated with 75 ml. of ether. Almost all of the orange material dissolves in the ether and a new yellow solid separates within one to two minutes. This material is collected after 1.5 hours and washed well with ether yielding 1.5 g. (47%) of the crude product, M.P. 102–103.5° C. dec. A portion of this crude product is purified by Soxhlet extraction with ether. Fine glistening yellow needles separate from the ether in the boiler flask, M.P. 107–111.5° C. dec.

Example 2.—Preparation of 3,3'-thiobis[4-phenyl-3H-1,2-dithiole]

A filtered solution of 1 g. (0.0036 mole) of 4-phenyl-1,2-dithiolium bisulfate in 25 ml. of water is treated at room temperature with hydrogen sulfide saturated water. A yellow solid separates instantaneously. To insure complete reaction, gaseous hydrogen sulfide is bubbled briefly through the mixture and the yellow solid is collected and washed well with water. The product is then triturated with acetone; yield 0.6 g. (85%), M.P. 143–145° C. dec.

Example 3

The compounds 3,3'-oxybis[4-phenyl-3-H-1,2-dithiole], 3,3'-oxybis[4-p-methoxyphenyl-3H-1,2-dithiole] and 3,3'-thiobis[4-phenyl-3H-1,2-dithiole] were tested as topical antifungal agents as follows:

Hartley strain, albino male guinea pigs weighing 300–350 g. (five animals per test and five controls) were used in the measurements. The animals were housed in individual cages and fed a prepared diet and had access to both feed and water at all times. *Microsporum canis* was the infecting organism. Virulence of the organism was maintained by animal to animal passage of infective hair suspension. The infective hair suspension was prepared by the following standard procedure: Guinea pigs infected with 0.5 milliliter of an undiluted or a 1 to 10 dilution of suspension from a preceding passage served as donors of infected hairs. At a time ranging from 7 to 14 days postinfection, but normally on the 14th day, hairs were pulled from the infected area and examined for fluorescence under ultraviolet light. Only hairs showing intense fluorescence at the root were selected. The selected hairs were weighed and ground into suspension with a Teflon grinder in sufficient diluent to give a final concentration of 3 milligrams of hair per milliliter of diluent. The diluent used was Sabouraud's medium (1% enzymatic protein digest and 2% dextrose), medicated by addition of 100 micrograms per milliliter of potassium penicillin G and 100 micrograms per milliliter of dihydrostreptomycin sulfate. This hair suspension is identified as undiluted stock hair suspension. Each stock hair suspension was examined for purity, and its content of viable organisms (spores) was estimated by seeding 10-fold dilutions in agar plates containing 1% enzymatic protein digest, 1% dextrose, 1.5% dehydrated fresh oxbile preparation, 2% agar, and 0.001% crystal violet, and incubating for 7 days at 30°±2° C.

Infection was by topical application of 0.5 milliliter of a 1 to 10 dilution of stock hair suspension to a specially prepared site on the left side of each guinea pig. Before the inoculum was applied, the hair was cut with an electric clipper and the shorn area cleared of hair debris and scurf with a couple of brisk strokes with a fiber hand brush. The inoculum was applied with a pipette. The tip of the pipette containing a single dose was pressed against the guinea pig skin and was then moved in a circular path completely covering an area of about 3 centimeters in diameter until the entire dose had been thoroughly rubbed into the skin. There was no run-off of inoculum at the completion of inoculation, and the inoculated area appeared reddened from the continuous excoriating action of the pipette tip. The application of inoculum took approximately one minute per guinea pig.

After inoculation, animals were treated ordinarily once daily with the drug under test, prepared in a Carbowax base (5% or 1% concentration) applied topically by rubbing about 0.5 g. of the drug-containing composition into the infected area. Controls were treated with appropriate vehicles containing no drug. Treatment ordinarily was begun on the third day post-infection and continued for 5 days (day 7). On day 10 and day 17 postinfection hair culture scores were determined as follows:

*Hair culture score.*—Four tufts of hair, one from each of four equidistant spots on the periphery of the infected area, were plucked and suspended in 5 milliliters of medicated Sabouraud's medium. Suspension was achieved by grinding the hairs with a motor-driven stainless steel pestle. One-half milliliter of the resulting suspension was seeded in agar plates containing 1% enzymatic protein digest, 1% dextrose, 1.5% dehydrated fresh oxbile preparation, 2% agar, and 0.001% crystal violet. The plates were examined for typical *Microsporum canis* growth after incubation for 7 days at 30°±2° C. The amount of growth was rated as follows:

No colonies=0
1–10 colonies=+
11–100 colonies=++
101–1000 colonies=+++
More than 1000 colonies=++++

Growth, by this technique, in infected, untreated controls ranged from a minimum of 1000 colonies to a maximum of 100,000 colonies.

Results of measurements carried out as described above are summarized in Table II.

TABLE II.—ACTIVITY AGAINST MICROSPORUM CANIS

| 3,3'-oxybis[4-phenyl-3H-1,2-dithiole] 5% concentration | | | 3,3'-oxybis[4-p-methoxyphenyl-3H-1,2-dithiole] 1% concentration | | | 3,3'-thiobis[4-phenyl-3H-1,2-dithiole] 5% concentration | | | Control | | |
|---|---|---|---|---|---|---|---|---|---|---|---|
| Guinea pig. No. | Day 10 | Day 17 | Guinea pig No. | Day 10 | Day 17 | Guinea pig No. | Day 10 | Day 17 | Guinea pig No. | Day 10 | Day 17 |
| 81 | +++ | ++++ | 36 | ++ | ++++ | 86 | ++ | +++ | 96 | ++++ | ++++ |
| 82 | ++ | ++++ | 37 | +++ | ++++ | 87 | ++++ | ++++ | 97 | ++++ | ++++ |
| 83 | ++ | +++ | 38 | ++ | ++++ | 88 | ++++ | ++++ | 98 | ++++ | ++++ |
| 84 | + | +++ | 39 | +++ | ++ | 89 | ++ | ++++ | 99 | ++++ | +++ |
| 85 | +++ | +++ | 40 | ++ | ++++ | 90 | ++ | ++++ | 100 | ++++ | +++ |

NOTE: A reduction to 1% or more of average spore population in control indicates significant antifungal activity i.e., a ++ indicates significant activity.

It is to be noted that in addition to their antifungal activity, the compounds of the present invention also exhibit in vitro antibacterial activity. Table III, below, shows the results obtained with 3,3'-oxybis[4-phenyl-3H-1,2-dithiole], 3,3'-oxybis[4-p-methoxyphenyl-3H-1,2-dithiole] and 3,3'-thio-bis[4-phenyl-3H-1,2-dithiole] when tested against a number of representative bacterial organisms.

TABLE III.—IN VITRO ANTIBACTERIAL ACTIVITY

[Minimal Inhibitory Concentration (μg./ml.)*]

| Organism | 3,3'-oxybis [4-phenyl-3H-1,2-dithiole] | 3,3'-oxybis [4-p-methoxy-phenyl-3H-1,2-dithiole] | 3,3'-thiobis [4-phenyl-3H-1,2-dithiole] |
|---|---|---|---|
| Microbacterium smegmatis | 15 | 15 | 15 |
| Bacillus subtilis | 15 | | 15 |
| Staphylococcus aureus | | 62 | |
| Do | | 62 | |
| Do | 250 | | >250 |
| Streptococcus pyogenes | | 31 | |

* Using agar dilution technique on trypticase soy agar.

The antibacterial activity of the novel compounds against medically important microorganisms shows the use of such compounds in controlling these organisms.

Example 4.—Preparation of 3,3' - oxybis[4-p-methoxy-phenyl-3H-1,2-dithiole]

The p-methoxy substituted dithiole compound is prepared substantially according to the procedure described for the preparation of 3,3' - oxybis[4-phenyl-3H-1,2-dithiole] making appropriate substitutions in the starting compound. The desired compound, recrystallized from ether, is golden yellow in color and melts at 101–103° C. dec.

What is claimed is:

1. A compound of the formula:

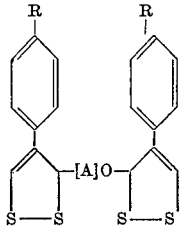

wherein the R's can be the same or different and are selected from the group consisting of hydrogen and methoxy.

2. The compound of claim 1 wherein the R's are hydrogen.

3. The compound of claim 1 wherein the R's are methoxy.

References Cited

Leaver et al.: J. Chem. Soc. (January 1965), pp. 34, 35.

JAMES A. PATTEN, Primary Examiner

U.S. Cl. X.R.

424—277